United States Patent [19]
Masuhara et al.

[11] Patent Number: 5,883,147
[45] Date of Patent: Mar. 16, 1999

[54] PHOTOPOLYMERIZABLE ADHESIVE COMPOSITION

[75] Inventors: Eiichi Masuhara, Tokyo; Shigeo Komiya, Urawa; Takeyuki Sawamoto, Tokyo; Satoko Maeda, Yokohama, all of Japan

[73] Assignee: Japan Institute of Advanced Dentistry, Japan

[21] Appl. No.: 476,368

[22] Filed: Jun. 7, 1995

Related U.S. Application Data

[63] Continuation-in-part of Ser. No. 140,121, Jan. 4, 1994, abandoned.

[51] Int. Cl.$^6$ .................................. C08F 2/50; C09J 4/02
[52] U.S. Cl. ............................. 522/42; 522/48; 522/172; 522/182; 522/40; 522/41
[58] Field of Search ..................................... 522/172, 181, 522/182, 99, 144, 33, 40, 41, 42, 48

[56] References Cited

U.S. PATENT DOCUMENTS

| | | | |
|---|---|---|---|
| 4,272,586 | 6/1981 | Ando et al. | 428/419 |
| 4,317,862 | 3/1982 | Honda et al. | 428/442 |
| 4,379,201 | 4/1983 | Heilmann et al. | 522/173 |
| 4,906,675 | 3/1990 | Inagaki et al. | 522/182 |
| 5,288,827 | 2/1994 | Li et al. | 522/172 |

FOREIGN PATENT DOCUMENTS

| | | |
|---|---|---|
| 0 287 516 | 10/1988 | European Pat. Off. |
| 149774 | 7/1987 | Japan . |
| 060981 | 3/1990 | Japan . |
| 252775 | 10/1990 | Japan . |

OTHER PUBLICATIONS

Derwent Week 8434 AN 84–210532 & JP–A–59 122 567 Matsushita Elec Ind. Abstract.

*Primary Examiner*—Susan W. Berman
*Attorney, Agent, or Firm*—Nixon & Vanderhye

[57] ABSTRACT

A photopolymerizable adhesive consisting of Compound (1) which contains at least one (meth)acryloxy group as a polymerizing group in its molecule, and other structures constructed from the group(s) selected from the group consisting of alkyl group, alkyloxy group, polyalkoxy group, siloxanyl group and the substituted group thereof substituted by fluorine, hydroxy or alkoxy group; Compound (2) selected from (meth)acrylic acids, hydroxyalkyl (meth)acrylates, (meth)acryloxyalkyl succinic acids, trialkoxyvinyl silanes and γ-(meth)acryloxyalkyl trialkoxy silanes; and Compound (3) selected from hydroxyacetophenones, acetophenones, glyoxy esters and camphorquinones, wherein said adhesive comprises 3 to 60 wt % of the compound (2), and 0.1 to 2 wt % of the Compound (3).

2 Claims, No Drawings

PHOTOPOLYMERIZABLE ADHESIVE COMPOSITION

CROSS REFERENCE

This application is a continuation-in-part of application Ser. No. 08/140,121 filed Jan. 4, 1994, now abandoned.

FIELD OF THE INVENTION

This invention relates to a photopolymerizable adhesive which can be polymerized by the irradiation with ultraviolet rays or visible light to provide an adhesive layer having an excellent adhesive property. Particularly, this invention relates to a photopolymerizable adhesive which provides an adhesive layer having an excellent ultraviolet transmittance and not being crazed nor colored even after long time exposure to the sunlight or ultraviolet rays.

BACKGROUND OF THE INVENTION

Recently, a photopolymerizable adhesive, which can be polymerized by the irradiation with ultraviolet rays or visible light, is widely used in various fields such as glass processing, electronics, optoelectronics and optics instead of a thermosetting or solvent adhesive such as an epoxide resin adhesive, an acrylic resin adhesive or a synthetic rubber adhesive since the photopolyaerizable adhesive is polymerized in a few seconds to a few minutes and exhibits a practical adhesive property upon being irradiated with ultraviolet ray or visible light.

Conventionally, such photopolymerizable adhesive comprises a photopolymerizable monomer and a photoinitiator. The photopolymerizable monomer generally includes a mixture of a multifunctional (meth)acrylate having a relatively large molecular weight and a high viscosity such as a bisphenol A-modified epoxy dimethacrylate, a urethane-modified di(meth)acrylate or a polyester-modified di(meth)acrylate with a radically polymerizable monomer having a relatively small molecular weight and a low viscosity such as hydroxyethyl (meth)acrylate, cyclohexyl (meth)acrylate, isodecyl (meth) acrylate, dimethylaminoethyl (meth)acrylate, N-vinylpyrrolidone or N,N-dimethylacrylamide.

The photoinitiator generally includes benzoin, benzoinalkyl ethers, benzophenone, benzophenone derivatives, benzil, thioxanthone, acetophenones and Michler's ketone.

However, a conventional photopolymerizable adhesive generally has a poor ultraviolet transmittance at a wavelength of 400 nm or less. Consequently, such an adhesive is not suitable for bonding a lens, prism, beam splitter or detecting window of an optical instrument in which a high pressure mercury lamp, a metal halide lamp or a mercury xenon lamp is used as the light source since the light energy from said light source is largely lost due to the absorption by the adhesive layer and is not be efficiently used.

Further, the conventional adhesive layer is colored in yellow or brown resulting in deterioration of its ultraviolet transmittance or is crazed or cracked upon intensive exposure to ultraviolet ray after photopolymerization. Therefore, the conventional adhesive cannot be used in an optical system under ultraviolet rays and is impracticable even for indirect application such as bonding and assembly of an inspection window or reflector in an ultraviolet exposing device or of a protecting cover in an ultraviolet lamp.

In addition, the conventional photopolymerizable adhesive has so poor weather resistance that the adhesive layer is colored in yellow or is crazed upon exposure to the sun light after polymerization and therefore, the conventional photopolymerizable adhesive is also impractical for bonding a window glass or assembling a showcase for outdoor usage.

It is generally believed that photochemical reactions such as oxidation and/or degradation caused by the absorption of light such as ultraviolet rays cause coloring, discoloring or deterioration of the mechanical property of a resin composition such as an adhesive.

Previously, many methods for avoiding such coloring or discoloring were proposed. Such methods include employing compounds having no benzene ring as photopolymerizable monomers and using a specific compound as a photoinitiator.

Another method is the addition of ultraviolet absorbents such as benzotriazole derivatives Or benzophenone derivatives to a photopolymerizable adhesive.

All of the above methods are based on the investigation of principal photochemical reactions of the photopolymerizable monomers, photopolymerizable adhesives or the ultraviolet absorbent. However, no attention was paid to the product of the side reaction of the photopolymerizable monomer with the photoinitiator. Further, substantially no investigation was carried out on the photochemical reaction of the photopolymerizable monomer with the ultraviolet absorbent. Consequently, no photopolymerizable adhesive which can stand intense ultraviolet ray irradiation and long-time exposure to ultraviolet rays has not been obtained. Further, ultraviolet transmittance of a conventional photopolymerizable adhesive containing an ultraviolet absorbent was hardly gained after adhesion.

SUMMARY OF THE INVENTION

The object of this invention is to solve the above problems of conventional photopolymerizable adhesives.

The photopolymerizable adhesive of this invention essentially consists of:

at least one Compound (1) which comprises at least one (meth)acryloxy group as a polymerizable group, the remaining residue consisting of one or more groups selected from alkyl, alkyloxy, polyalkyloxy and siloxane groups, which may be optionally substituted by one or more fluorine, hydroxy and/or alkoxy groups, wherein Compound (1) is selected from the group consisting of
  (a) alkanediol di(meth)acrylates,
  (b) cycloalkanediol di(meth)acrylates,
  (c) di- or polyalkyleneglycol di(meth)acrylates,
  (d) trimethylolpropane tri(meth)acrylates,
  (e) glycerol -di(meth)acrylates,
  (f) pentaerythritol poly(meth)acrylates,
  (g) bia[(meth)acryloxyalkyl]siloxanes,
  (h) siloxanyl (meth)acrylates,
  (i) alkyl (meth)acrylates,
  (j) polyalkylene glycol or alkyloxyalkyl (meth) acrylates,
  (k) hydroxyalkyl (meth)acrylates, and
  (l) glycidyl (meth)acrylates;
at least one Compound (2) selected from the following group (Group A) consisting of
  (meth)acrylic acids,
  hydroxyalkyl (meth)acrylates,
  (meth)acryloxyalkyl succinic acids,
  trialkoxy vinylsilanes, and
  γ-(meth)acryloxyalkyl trialkoxysilanes, and
at least one Compound (3) selected from the following group (Group B) consisting of hydroxy acetophenones,
acetophenones,
glyoxy esters and
camphorqainones;
wherein the amount of Compound (2) is 3 to 60% by weight and the amount of Compound (3) is about 0.1 to about 2% by weight.

DETAILED DESCRIPTION OF THE INVENTION

This invention will be described in detail in the following.

In the photopolymerizable adhesive of this invention, Compound (1) is a compound having at least one (meth) acryloxy group as a polymerizable group. The remaining residue consists of one or more groups selected from an alkyl group, an alkyloxy group, a polyalkyloxy group, a siloxanyl group. These groups can be substituted by one or more fluorine, hydroxy and/or alkyloxy groups. Specifically, Compound (1) is a compound selected from the group of (a) alkanediol di(meth)acrylates,
(b) cycloalkanediol di (meth)acrylates,
(c) polyalkyleneglycol di(meth)acrylates,
(d) trimethylolpropane tri(meth)acrylates,
(e) glycerol di(meth)acrylates,
(f) pentaerythritol poly (meth) acrylates,
(g) bis[(meth)acryloxyalkyl]siloxanes,
(h) siloxanyl (meth)acrylates,
(i) alkyl (meth) acrylates,
(j) polyalkylene glycol or alkyloxyalkyl (meth)acrylates,
(k) hydroxy alkyl (meth)acrylates, and
(l) glycidyl (meth)acrylates.

The compounds included in the groups of (a) to (l) are as follows:

(a) The alkanediol di(meth)acrylates include:
ethylene glycol (meth)acrylate,
propylene glycol (meth)acrylate,
1,4-butanediol di(meth)acrylate,
1,6-hexanediol di(meth)acrylate,
tetradecanediol di (meth) acrylate,
pentadecanediol di(meth)acrylate,
long chain fatty diol di(meth)acrylate, and
neo-pentylglycol di(meth)acrylate.

(b) The cycloalkanediol di(meth)acrylates include:
bis(meth)acryloxymethyl tricyclo[5,2,1,0$^{2,6}$]decane,
methoxylated cyclohexyl di(meth)acrylate,
hydrogenated bisphenol-A di(meth)acrylate, and
bis[(meth)acryloxy-2-hydroxypropyl cyclohexyl] propane.

(c) The polyalkyleneglycol di(meth)acrylates include:
diethylene glycol di(meth)acrylate,
triethylene glycol di(meth)acrylate,
tetraethylene glycol di(meth)acrylate,
polyethylene glycol di(math)acrylate,
dipropylene glycol di(meth)acrylate,
tripropylene glycol di(meth)acrylate,
tetrapropylene glycol di(meth)acrylate, and
polypropylene glycol di(meth)acrylate, (d) The trimethylolpropane tri(meth)acrylates include:
trimethylolpropane tri(meth)acrylate,
ethyleneoxide-modified trimethylolpropane tri(meth) acrylate,
propyleneoxide-modified trimethylolpropane tri(math)acrylate,
neopentylglycol-modified trimethylolpropane tri(meth) acrylate, and
epichlorohydrin-modified trimethylolpropane tri(meth) acrylate.

(e) The glycerol di(meth)acrylates include:
glycerol di(meth)acrylate,
epichlorohydrin-modified ethyleneglycol di(meth) acrylate,
epichlorohydrin-modified propyleneglycol di(meth) acrylate,
triglycerol di(meth)acrylate, and
epichlorohydrin-modified 1,6-hexanediol di(meth) acrylate.

(f) The pentaerythritol poly(meth)acrylates include:
pentaerythritol tri(meth)acrylate,
pentaerythritol tetra(meth)acrylate,
dipentaerythritol hexa(meth)acrylate,
dipentaerythritol monohydroxy penta(meth)acrylate,
alkyl-modified dipentaerythritol tri(meth)acrylate,
alkyl-modified dipentaerythritol tetra(meth)acrylate, and
alkyl-modified dipentaerythritol penta(meth)acrylate.

(g) The bis[(meth)acryloxyalkyl]siloxanes include the compounds represented by the following formula:

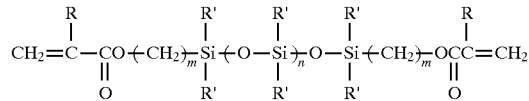

wherein R denotes —H or a methyl group, m is an integer of from 2 to 4, n is an integer of from 0 to 60 and R' denotes a methyl group or a group of —(CH$_2$)$_1$ R$_f$ (1 is an integer of from 1 to 4 and R$_f$ is a perfluoroalkyl group).

(h) The siloxanyl (meth)acrylates include the compounds represented by the following formula:

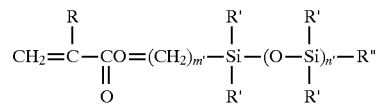

wherein R denotes —H or a methyl group, m' is an integer of from 2 to 4, n, is an integer of from 0 to 60 and R' denotes a methyl group or a group of —(CH$_2$)$_1$R$_f$ (1 is an integer of from 1 to 4 and R$_f$ is a perfluoroalkyl group).

(i) The alkyl (meth)acrylates include
methyl (meth)acrylate,
ethyl (meth)acrylate,
n-propyl (meth)acrylate,
n-butyl (meth)acrylate,
n-hexyl (meth)acrylate,
octyl (meth)acrylate,
lauryl (meth)acrylate,
stearyl (meth)acrylate,
isopropyl (meth)acrylate,
isobutyl (meth)acrylate,
isooctyl (meth)acrylate,
isodecyl (meth)acrylate,
cyclohexyl (meth)acrylate,
4-tert.-butylcyclohexyl (meth) acrylate,
isobornyl (meth)acrylate, and
(meth)acrylic acid tricyclo[5,2,1,0$^{2,6}$]decane.

The alkyl (meth)acrylates also include alkyl (meth) acrylates wherein the alkyl group is a fluoroalkyl group of —(CH$_2$)$_1$R$_f$ (1 is 0 or an integer of from 1 to 4, R$_f$ is a perfluoroalkyl group).

(j) The polyalkylene glycol or alkyloxyalkyl (meth) acrylates include
- 2-methoxyethyl (meth)acrylate,
- metboxydiethylene glycol (math)acrylate,
- methoxytriethylene glycol (meth)acrylate,
- methoxypolyethylene glycol (meth)acrylate,
- methoxydipropylene glycol (meth acrylate,
- methoxypolypropylene glycol (meth)acrylate,
- 2-ethoxyethyl (meth)acrylate,
- 2-(2-ethoxyethoxy)ethyl(meth)acrylate,
- butoxyethyl (meth)acrylate,
- butoxyethylene glycol (meth)acrylate,
- polyethylene glycol (meth)acrylate,
- polypropylene glycol (meth)acrylate, and
- glycerol (meth)acrylate.

(k) The hydroxyalkyl (meth)acrylates include:
- hydroxyethyl (meth)acrylate,
- hydroxypropyl (meth)acrylate,
- hydroxybutyl (meth) acrylate,
- 1,6-hexanediol mono(meth)acrylate, and
- 1,8-octanediol mono(meth)acrylate.

(l) The glycidyl (meth)acrylates include qlycidyl (meth) acrylate.

Compound (1) is the ingredient which provides the photopolymerizable adhesive of this invention with excellent ultraviolet transmittance, ultraviolet resistance and weather resistance.

The compounds included in Compound (1) also have the following characteristics in common;
- having no conjugated structure in their molecules other than (meth)acryloxy group(s), such as aromatic ring, heterocyclic ring, diene or diketone;
- having no eater or carbonate bond except (meth)acryloxy group; and
- having no atoms other than carbon, oxygen, hydrogen, fluorine and silicon.

Compound (1) also has a molecular extinction coefficient of ultraviolet rays with a wavelength of 250 nm or more and visible light of 100 or less and has a very low absorbency in the range of wavelength.

The ingredients predominantly used in conventional photopolymerizable adhesives, such as bisphenol A-modified di(meth)acrylate, urethane-modified di(meth)acrylate, and polyester-modified di(meth)acrylate, do not have the above characteristics.

In this invention, the amount of Compound (1) is preferably 40 to 97% by weight, more preferably 70 to 90% by weight, based on the whole amount of the adhesive to provide the adhesive with both a high bonding strength and a good water resisting property.

Preferably, 10 to 50% by weight of Compound (1) comprises one or more compounds selected from the group consisting of
(a) alkanediol di(meth)acrylates,
(b) cycloalkanediol di(meth)acrylates,
(c) di- or polyalkyleneglycol di(meth)acrylates,
(d) trimethylolpropane tri(meth)acrylates,
(e) glycerol di(meth)acrylates,
(f) pentaerythritol poly(meth)acrylates, and
(g) bis[(meth)acryloxyalkyl]siloxanes, all of which have two or more (meth)acryloxy groups, and 90 to 50% by weight of Compound (1) is selected from the compounds having one (meth)acryloxy group, i.e.,
(h) siloxanyl (meth)acrylates,
(i) alkyl (meth)acrylates,
(j) polyalkylene glycol or alkyloxyalkyl (meth)acrylates,
(k) hydroxyalkyl (meth)acrylates and
(l) glycidyl (meth)acrylates.

The above combination of the compounds included in Compound (1) provides the adhesive with both a further improved photopolymerizabilty and a better adhesive property.

Compound (2) of the photopolymerizable adhesive of this invention is selected from group A consisting of
- (meth) acrylic acids,
- hydroxyalkyl (meth) acrylates,
- (meth) acryloxyalkyl succinic acids,
- trialkoxy vinyl silane, and
- γ-(meth acryloxyalkyl trialkoxysilanes.

The (meth)acrylic acids, the hydroxyalkyl (meth)acrylates and the (meth)acryloxyalkyl succinic acids include
- (meth)acrylic acid,
- (meth)acryloxyethyl succinic acid,
- (meth)acryloxypropyl succinic acid,
- (meth)acryloxybutyl succinic acid,
- 2-hydroxyethyl (meth)acrylate,
- 2-hydroxypropyl (meth)acrylate,
- butanediol mono(meth)acrylate,
- polyethylene glycol mono(meth)acrylate,
- polypropylene glycol mono(meth)acrylate,
- polyethylene glycol/polypropylene glycol mono(meth) acrylate.

The trialkoxy vinyl silanes and γ(meth) acryloxyalkyl trialkoxysilanes include the compounds having the following formulas:

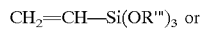

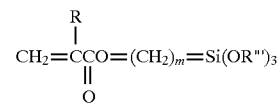

wherein R is —H or a methyl group, R'" is an alkyl group and m is an integer of 3 or 4.

Compound (2) provides an excellent adhesive to the photopolymerizable adhesive of this invention, and further the compounds included in Compound (2) share the following characteristics:
- having no conjugated structure except the polymerizable (meth)acryloxy and/or vinyl groups in their molecules, such as aromatic ring, hereto ring, diene or diketone;
- having no ester or carbonate bond except the (meth)acryloxy group; and
- having no nitrogen or halogen atom.

Like Compound (1), Compound (2) has a molecular extinction coefficient of ultraviolet rays with a wavelength of 250 nm or more and visible light of 100 or less and has a very low absorbancy in said range of wavelength.

The amount of Compound (2) is at least 3% by weight. If the amount is less than 3 wt %, the adhesive property of the adhesive of this invention declines and the adhesive do not work effectively as an adhesive.

While hydroxyalkyl (meth) acrylates are included not only in Compound (1) but also Compound (2), any photopolymerizable adhesive containing such a hydroxyalkyl (meth)acrylate in an amount more than 3% by weight falls within the scope of this invention. Thus, the same compound may be used as both Compounds (1) and (2).

The amount of Compound (2) is preferably 60% by weight or less for obtaining an excellent water resistance of an adhesive layer. More preferably, the amount is 10 to 30% by weight.

Compound (3) is selected from the group B consisting of hydroxy acetophenones, acetophenones, glyoxy esters, and camphorquinones. The amount of Compound (3) is about 0.1 to about 2% by weight based on the total amount of the photopolymerizable adhesive.

Compound (3) includes hydroxyacetophenones such as
1-phenyl-2-hydroxy-2-methylpropane-1-one,
1-(3,4-dimethylphenyl)-2-hydroxy-2-methylpropane-1-one,
1-(4-isopropylphenyl)-2-hydroxy-2-methylpropane-1-one,
1-(4-tert.butylphenyl)-2-hydroxy-2-methylpropane-1-one,
4-(2-hydroxyethoxyphenyl)-2-hydroxy-2-methylpropane-1-one, and
1-hydroxycyclohexylphenylketone;
acetophenones such as
diethoxyacetophenone and p-tert.butyltrichloroacetophenone; glyoxy esters such as
alkylphenylglyoxylate;
camphorquinones such as
camphorquinone and camphorquinone derivatives, Compound (3) is a photoinitiator which generates free radicals when being irradiated with light such as ultraviolet rays and/or a visible light, and provides the adhesive of as invention with excellent photopolymerization property.

Compound (3) has the following characteristics:

1. All of the hydroxyacetophenones, acetophenones glyoxy esters absorb the light having a wavelength of 300 nm or more, i.e. near ultraviolet rays. Such initiators are a cleavage type-initiator, which generates radicals on cleavage when irradiated by the light having a wavelength of 300 nm or more. The absorbancy of these compounds in the ultraviolet range of wavelength decreases after the decomposition thereof.

2. Camphorquinones initiate photopolymerization through hydrogen abstraction from themselves or from the other compounds around them when being irradiated with light and therefore, they are called hydrogen pull out-type initiators. Therefore, no destruction of the molecular structures accompanied by cleavage occurs in these initiators; however, these initiators become colorless when the conjugated structure of diketons is destroyed by hydrogen abstraction.

3. Therefore, none of Compound (3) produces colored products such as benzyl radicals and benzenoids when decomposed by irradiation with light.

The amount of Compound (3) is about 0.1 to about 2% by weight based on the whole amount of the photopolymerizable adhesive. If the amount is less than the lower limit of the above range the photopolymerizing property of the adhesive deteriorates so that the adhesive does not polymerize sufficiently when being irradiated with light and the adhesive cannot be practically used as an adhesive. On the other hand, if the amount is beyond the upper limit of the range unreacted Compound (3) remains in the adhesive even after photopolymerization and absorbs ultraviolet rays and consequently, any ultraviolet-transmissive adhesive cannot be obtained.

There are described on Compounds (1) to (3) individually in the above. In the following, the specific features of the photopolymerizable adhesive of this invention owing to the combination of Compound (1) with Compounds (2) and (3) in a specific amount ratio are set forth.

The adhesive of this invention contains Compounds (1), (2) and (3) in specific amounts, exhibits an excellent adhesive property when being polymerized by irradiation with light, has an excellent ultraviolet and visible light transmittance after being polymerized and does not cause deterioration such as crazing or coloring even after a long-time exposure to ultraviolet rays or the sunlight, Compounds (1) and (2) have excellent transmittance of ultraviolet rays having a wavelength of 250 nm or more and visible light. However, when Compounds (1) and (2) are polymerized by using a conventional photoinitiator such as benzophenone or thioxanthone, only a polymer having a quite poor ultraviolet transmittance is obtained and the objects of this invention can not be achieved.

A photochemical reaction product having a small absorbancy of ultraviolet rays and visible light can be obtained when irradiating Compound (3) with light, while, when conventional photopolymerizable monomers such as bisphenol A-modified di(meth)acrylate or urethane-modified di(Meth)acrylate are polymerized by using Compound (3) as a photoinitiator, only a polymer having a low-transmittance of ultraviolet rays and a poor ultraviolet or weather resistance is obtained and therefore, the object of this invention cannot be achieved.

These phenomena suggest that the ultraviolet transmittance and ultraviolet and weather resistance can be obtained only when Compounds (1) and (2), both of which are photopolymerizable monomers, and Compound (3), which is a photoinitiator, are used in combination.

Thus, any photopolymerizable adhesives which have both a good ultraviolet transmittance and an excellent ultraviolet and weather resistance cannot be obtained by separately incorporating Compounds (1), (2) and/or (3) in a conventional photopolymerizing adhesive.

Namely, the objects of this invention can be achieved only when Compounds (1) and (2) are combined with Compound (3) in a specific proportion.

Compounds (1) and (2) of this invention are the ingredients which are polymerized into a polymer having a high molecular weight. They have no conjugated structure such as aromatic ring, heterocyclic ring, diene or diketone. Further, they have no ester or carbonate groups except for (meth)acryloxy groups. Further, they have no bond that has a low dissociation energy, such as a carbon-nitrogen, carbon-sulfur, carbon-phosphorus, carbon-chlorine, carbon-bromine or carbon-iodine bond. In addition, since unsaturated bonds between carbon and carbon of vinyl groups or (meth)acryloxy groups vanish after photopolymerization, the resulting polymers are photochemically very stable.

As Compounds (1) and (2) have photochemically stable structures,, by-products other than the intermediate products which are involved in the subsequent polymerization reaction are hardly produced in the photochemical reaction between them and photoinitiators.

No compound which has strong absorption of ultraviolet and visible light is formed by the photochemical reaction of Compound (3) per se. In addition, since Compound (3) is present in a quite limited amount, the transmittance of the adhesives of ultraviolet ray and a visible light is not deteriorated.

Accordingly, in the photopolymerizable adhesives of this invention obtained by adding Compound (3) in the specific proportion to the above mentioned Compounds (1) and (2), any photochemical reaction products which have high photochemical reactivity are not produced by photopolymerization. And, the absorbancy of ultraviolet rays and a visible light by the photopolymerized adhesives is very low.

Small quantities of other optional ingredients may also be added so far as the advantages of this invention are not detracted.

As the optional ingredients, a polymer such as polyalkyl (meth)acrylate can be incorporated in an amount of 5 wt % or less for modifying the viscosity of the photopolymerizable adhesive.

It is preferred that the structure of the optional polymer dissolved in the adhesive is similar to that of Compounds (1) and (2). It is preferred not to use for example polymers which contain phenyl ring such as polystyrene and polycarbonate, or polymers having a conjugated structure such as liquid or powdery polybutadiene and polyisoprene.

Other optional ingredients are, for example, organic peroxides having no phenyl ring. The examples of the organic peroxides are succinic acid peroxide, tert.-butylhydroperoxide, lauroylperoxide and di-tert.-butylperoxide.

In addition to photopolymerizability, thermal polymerizability is given to the photopolymerizable adhesive upon incorporating the above organic peroxides. Therefore, the field to which the photopolymerizable adhesive of this invention can be applied is extended since such adhesive can be applied to an area which can not be irradiated with light.

Other optional ingredients are those monomers which can improve the adhesive properties of the adhesive of this invention without deteriorating the other properties of said adhesive.

The examples of such monomers are aliphatic phosphoric acid (meth)acrylates represented by the following formulas:

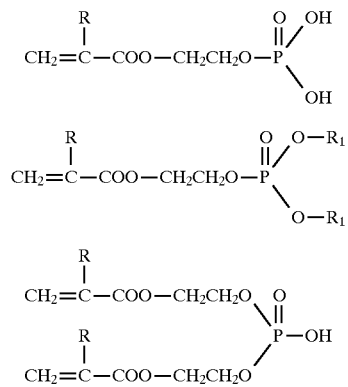

wherein R is hydrogen or methyl and $R_1$ is an alkyl group, They are used in an amount of 1 wt % or less.

This invention will now be described in more detail with reference to the following examples.

EXAMPLE 1

The photopolymerizable adhesive according to this invention consisting of 18 wt % of triethylene glycol di(meth) acrylate and 56 wt % of γ-methacryloxy tricyclo[$5,2,1,0^{2,6}$] decane as Compound (1), 20 wt % of 2-hydroxyethyl methacrylate and 5.5 wt % of triethoxyvinylsilane as Compound (2), and 0.5 wt % of 1-hydroxycyclohexyl phenyl ketone as Compound (3) was prepared. This adhesive was applied on a colorless, transparent glass plate having a good transmittance of ultraviolet rays having a wavelength of 300 nm or more and visible light. Another glass plate which was made of the same material was laid on the above plate.

Next, this adhesive was irradiated for a period of 10 minutes, with ultraviolet rays with a 400 W high-pressure mercury lamp which had 8 mW/cm$^2$ irradiation intensity at a wavelength of 360 nm.

The two plates of glass were found to be colorless, transparent and firmly bonded together. Any discoloring to yellow or brown was not observed in appearance. The transmittance of the resultant Sample obtained by bonding two glass plates as described above was measured with a spectrophotometer. This sample had good transparency to ultraviolet rays of a wavelength of 300 nm or more, and the transmittance thereof was 87% at a wavelength of 360 nm, and 91% at a wavelength of 400 nm, respectively.

Then, the ultraviolet resistance test of the resultant sample was carried out by irradiating with intense ultraviolet rays of an irradiation intensity of 30 mW/cm$^2$ at a wavelength of 360 nm for 200 hours with a metal halide lamp.

After the 200 hour-irradiation test, the sample was transparent and showed no change in appearance, such as discoloring, cracks or peeling of an adhesive layer. The transmittances thereof at a wavelength of 360 nm and 400 nm were 89% and 90%, respectively, thus confirming that it had excellent ultraviolet resistance.

Subsequently, the other Samples prepared in the same manner as mentioned in the above were kept outdoors for six months to irradiate them with the sunlight. Thus the weather resistance test of said samples was carried out. After the weather test, the glass plates were colorless and transparent and showed no change in appearance, as in the ultraviolet resistance test. The transmittances thereof at a wavelength of 360 nm and 400 nm were 88% and 90%, respectively, thus confirming that they had excellent weather resistance.

EXAMPLES 2 TO 8

With varying the nature and the amount of Compounds (1), (2) and (3) as shown in Table 1, the photopolymerizable adhesives were prepared. The samples were prepared by bonding glass plates with said adhesives in the same manner as mentioned in Example 1. The bonding properties, transmittance of ultraviolet rays, ultraviolet resistance and weather resistance were evaluated.

Table 1 shows the compositions of the photopolymerizable adhesives of each example and the results of each test.

As shown Table 1, the photopolymerizable adhesives of this invention showed not only good bonding properties but also excellent transmittance and ultraviolet resistance. Further, the photopolymerizable adhesive showed excellent weather resistance in the six months-outdoor exposure test.

Comparative Example 1

The photopolymerizable adhesive was prepared in accordance with Example 1 except for using 74% by weight of bis[4-acryloxy-2-hydroxypropylphenyl]propane, which had been used as a main ingredient of a conventional photopolymerizable adhesive, instead of triethylene glycol dimethacrylate and methacryloxy tricyclo[$5,2,1,0^{2,6}$]decane. Two glass plates were bonded with the resultant adhesive in the same manner as mentioned in Example 1 and excellent bonding properties were observed. The transmittance of the resultant sample was 80% at a wavelength of 360 nm, and 88% at a wavelength of 400 nm, respectively.

Next, irradiation with an ultraviolet light by using of metal halide lamp for 200 hours was carried out in line with Example 1. There were neither cracks nor peeling, but the sample was colored in yellow.

Measurement with a spectrophotometer of the transmittance of the samples after irradiation for 200 hours showed the transmittance of 58% at a wavelength of 360 nm and the transmittance of 82% at a wavelength of 400 nm.

The remarkable change in transmittance was caused by ultraviolet light irradiation.

Further, the samples prepared in the same manner were exposed outdoors for six months in this Comparative Example 1. The adhesive layer of the samples was colored in yellow, and the appearance deteriorated remarkably.

Comparative Examples 2 to 4

Photopolymerizable adhesives were prepared from photopolymerizable monomers and photoinitiators as shown in Table 1. Two pieces of glass plates were bonded with these adhesives to obtain samples and the bonding properties, transmittance of ultraviolet light, ultraviolet resistance and weather resistance of the samples were evaluated. Table 2 shows the composition of the photopolymerizable adhesives, and the results of performance tests of each sample.

As shown in Table 2, the photopolymerizable adhesives of these Comparative Examples did not simultaneously exhibit good transmittance of ultraviolet light, good ultraviolet resistance and weather resistance, and were interior to the photopolymerizable adhesives of this invention.

Comparative Example 5

With varying the amount of Compounds (1) and (2) used in Example 1, a photopolymerizable adhesive having the amount of Compound (2) of less than the lower limit of the range of this invention was prepared. Namely, the adhesive consisted of 42% by weight of triethylene glycol di(meth) acrylate and 56 wt % of methacryloxy tricyclo[5,2,1,0$^{2,6}$] decane (both are included in Compound (1)), 1% by weight of hydroxyethyl (meth)acrylate and 0.5% by weight of triethoxyvinylsilane (both are included in Compound (2)) and 0.5% by weight of 1-hydroxycyclohexyl phenyl ketone (Compound (3)).

The resultant photopolymerizable adhesive was used for bonding the glass plates in the same manner as in Example 1. After the photopolymerization, the glass plates were easily peeled off each other only under a small peeling force. The result shows that the adhesive had a poor adhesive property.

Comparative Example 6

A photopolymerizable adhesive was prepared in line with Example 1, except that the quantity of 1-hydroxycyclohexyl phenyl ketone, used as Compound (3) in Example 1, was 5% by weight which was out of the range defined in this invention, and that on the other hand, the quantity of 2-hydroxyethyl methacrylate used as Compound (2) was 15.5% by weight.

Upon bonding two glass plates with the resultant photopolymerizable adhesive in accordance with Example 1, colorless and transparent sample wherein the glass plates were firmly bonded was obtained.

However, the transmittance of the sample was less than 60% at a wavelength of 360 nm.

This result indicates that the sample had poor ultraviolet transmittance.

As shown in the above examples, the photopolymerizable adhesive of this invention has not only good adhesive property, but also excellent ultraviolet transmittance, ultraviolet resistance and weather resistance.

Therefore, it is possible to carry out a simple bonding process by using the photopolymerizable adhesive of this invention in various applications such as assembly of optical systems of ultraviolet-exposure device used in making a semiconductor, adhesive bonding of a filter or a window used in optical system of fiber-light source of ultraviolet, and building up a glass showcase used for outdoor display.

The terms used in Tables 1 and 2 mean as follows, respectively.

*1: The appearance of the samples prepared by bonding together the glass plates having 1 mm of thickness is visually observed. The results obtained are evaluated according to the following standards.
   A: The samples which were not colored in yellow, reddish brown, brown or other colors, and had no fissures, cracks or other physical defects.
   B: The samples which had no physical defects such as fissures and cracks, but were colored in yellow or brown.
   C: The samples which were colored deeply in reddish brown or brown, or had physical defects such as fissures and cracks.

*2: The adhesive property were evaluated according to the following standards with respect to the conditions when the bonded glass plates are subjected to a peeling force added by fingers.
   A: Samples which were not separated even under a fairly strong peeling force.
   B: Samples which were separated under an intermediate peeling force.
   C: Samples which were easily separated under a slight peeling force.

*3: The transmittances of light are measured by a spectrophotometer at a wavelength of 360 nm and 400 nm, wherein the samples had been made by bonding two glass plates having 1 mm of thickness together.

*4: The ultraviolet resistance is evaluated by measuring the light transmittance of the samples which are made by bonding two glass plates having 1 mm of thickness together, after continuous irradiation with ultraviolet rays at an irradiation intensity of 30 mW/cm$^2$ at a wavelength of 360 nm with a metal halide lamp for 200 hours.

*5: The weather resistance is evaluated by appearance and light transmittance of the samples which are made by bonding two glass plates having 1 mm of thickness together, after standing the samples outdoors and exposing directly to the sunlight for six months.

Explanation of Symbols used in Tables

The symbols used in Tables 1 and 2 represent the following compounds [Compound (1)]
   DCPA: bis[acryloxyethyl]tricyclo[5,2,1,0$^{2,6}$]decane
   TCDM: methacryloxytricyclo[5,2,1,0$^{2,6}$]decane
   6FMA: 1,1,2,2-tetrahydro-fluorooctylmethacrylate
   TGMA: triglyceroldimethacrylate
   IABMA: isobornylmethacrylate
   BMA: n-butylmethacrylate
   OSMA: bis[methacryloxypropyl] oligodimethylsiloxane
   TCDA: acryloxytricyclo[5,2,1,0$^{2,6}$]decane
   TEGMA: triethyleneglycoldimethacrylate
   HDM: 1,6-hexanedioldimethacrylate
   PETMA: pentaerythritoltrimethacrylate PEGMA: polyethyleneglycoldimethacrylate
TMPTA: trimethylolpropanetrimethacrylate [Compound (2)]
MPTMS: γ-methacryloxypropyltrimethoxysilane
HEMA: 2-hydroxyethylmethacrylate
TVSi: triethoxyvinylsilane
MA; methacrylic acid
SAMA: methacryloxyethylsuccinic acid
BDMA: butanediolmonomethacrylate
HPA: hydroxypropylacrylate
[Photopolymerizable monomers other than Compound (1) or (2)]
UDMA: isophorondiisocyanate-modified dimethacrylate
PEA: aliphatic polyesterdimethacrylate
DMEA: N,N-dimethylaminoethylmethacrylate
BGMA: bis[methacryloxy-2-hydroxypropylphenyl]propane
BEMA: bis[methacryloxyethyloxyphenyl]propane [Compound (3)]
HCPK: 1-hydroxycyclohexylphenylketone
HMPP: 1-phenyl-2-hydroxy-2-methylpropane-1-one
CQ: d,1-Camphorquinone
[Photoinitiators other than Compound (3)]
LPO: lauroylperoxide
MPGO: methylphenylglyoxylate
DEAP: diethoxyacetophenone
BP: benzophenone
DMPT: N,N-dimethyl-p-toluidine

TABLE 1

| Example No. | photo-polymerizable (wt %) Compound (1) | adhesive compositions Compound (2) | Compound (3) | characteristics of the photopolymerizable adhesives adhesive appearance *1 | adhesive property *2 | transmittance (% T) *3 360 nm | transmittance (% T) *3 400 nm | ultraviolet resistance *4 appearance | transmittance (% T) 360 nm | transmittance (% T) 400 nm | weather resistance *5 appearance | transmittance 360 nm | transmittance 400 nm |
|---|---|---|---|---|---|---|---|---|---|---|---|---|---|
| 2 | DCPA/TCDM (10/80) | MPTMS (9) | HCPK (1) | A | A | 88 | 92 | A | 89 | 91 | A | 88 | 90 |
| 3 | 6FMA/TCDM (20/66.5) | HEMA (13) | HCPK (0.5) | A | A | 85 | 91 | A | 87 | 90 | A | 86 | 89 |
| 4 | TGMA/IEMA/BMA (20/18/55) | TVSi (6.5) | HMPP (0.5) | A | A | 88 | 92 | A | 88 | 91 | A | 88 | 91 |
| 5 | OSMA/TCDA (36/46) | HEMA/MA (15/2) | CQ/LPO (0.5/0.5) | A | A | 87 | 92 | A | 88 | 90 | A | 87 | 91 |
| 6 | TCDN/TEGMA/HDM (67/11/11) | MA/TVSi (5/5) | HCPK/MPGO (0.5/0.5) | A | A | 89 | 92 | A | 90 | 91 | A | 89 | 91 |
| 7 | PETMA/PEGMA (15/64) | HEMA/SAMA (10/10) | DEAP (1) | A | A | 86 | 91 | A | 87 | 89 | A | 86 | 89 |
| 8 | TCDM/OSMA/TMPTA (70/10/10) | ECMA/HPA (3/6.5) | HCPK (0.5) | A | A | 88 | 92 | A | 88 | 91 | A | 87 | 97 |

TABLE 2

| Example No. | photopolymerizable adhesive compositions (wt %) photopolymerizable monomer | photoinitiator | characteristics of the photopolymerizable adhesives adhesive appearance *1 | adhesive property *2 | transmittance (% T) *3 360 nm | transmittance (% T) *3 400 nm | ultraviolet resistance *4 appearance | transmittance (% T) 360 nm | transmittance (% T) 400 nm | weather resistance *5 appearance | transmittance 360 nm | transmittance 400 nm |
|---|---|---|---|---|---|---|---|---|---|---|---|---|
| 2 | UDMA/TCDM/MPTMS (60/30/9) | HCPK (1) | B | A | 78 | 87 | C | 0 | 3 | B | 26 | 63 |
| 3 | PEA/TCDA/HEA/DMEMA (20/66/10/3) | BP (1) | A | A | 47 | 88 | B | 0 | 12 | B | 17 | 67 |
| 4 | BGMA/BEMA/HEMA (50/16/32) | CQ/DMPT (1/1) | A | A | 67 | 89 | B | 21 | 58 | B | 37 | 72 |

What is claimed is:

1. A photopolymerizable adhesive composition consisting essentially of: at least one compound (1) is selected from bis(meth)acryloxymethyl tricyclo[5,2,1,0$^{2,6}$]decane, triglycerol di(meth)acrylate bis[(meth)acryloxyalkyl]siloxane represented by the following formula

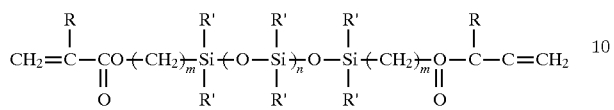

wherein R denotes —H or methyl group, m is an integer of from 2 to 4, n is an integer from 0 to 60, and R' denotes an alkyl group,
(meth)acrylic acid tricyclo[5,2,1,0$^{2,6}$]decane, and 1,1,2,2-tetrahydrofluorooctyl(meth)acrylate;

at least one compound (2) selected from
2-hydroxy(meth)acrylate,
γ-(meth)acryloxypropyl trimethoxysilane, and triethoxysilane;

at least one compound (3) selected from
1-hydroxycyclohexyl phenylketone and d,1-camphorquinone;

wherein the amount of compound (1) is 40 to 97% by weight based on the total weight of the composition and the amount of compound (3) is 3 to 60% by weight based on the total weight of the composition.

2. The photopolymerizable adhesive composition according to claim 1, wherein the amount of compound (1) is 70 to 90% by weight based on the total weight of the composition and the amount of compound (2) is 10 to 30% by weight based on the total weight of the composition.

* * * * *